United States Patent [19]

Shirai

[11] Patent Number: 5,416,646
[45] Date of Patent: May 16, 1995

[54] DATA RECORDING AND REPRODUCING APPARATUS HAVING READ/WRITE CIRCUIT WITH PROGRAMMABLE PARAMETER MEANS

[75] Inventor: Ikuo Shirai, Tokyo, Japan

[73] Assignee: Kabushiki Kaisha Toshiba, Kawasaki, Japan

[21] Appl. No.: 152,222

[22] Filed: Nov. 12, 1993

[30] Foreign Application Priority Data

Nov. 12, 1992 [JP] Japan ................................. 4-301479

[51] Int. Cl.[6] .............................................. G11B 5/09
[52] U.S. Cl. .......................................... 360/46; 360/53
[58] Field of Search ....................... 360/31, 46, 53, 65; 369/53, 54, 59

[56] References Cited

U.S. PATENT DOCUMENTS

| | | | |
|---|---|---|---|
| 4,794,469 | 12/1988 | Kaido et al. | 360/65 |
| 4,821,125 | 4/1989 | Christensen et al. | 360/31 |
| 4,908,722 | 3/1990 | Sonobe | 360/46 |
| 5,077,623 | 12/1991 | McSweeney | 360/65 |
| 5,172,280 | 12/1992 | Quintus et al. | 360/46 |

*Primary Examiner*—Aristotelis Psitos
*Assistant Examiner*—Won Tae C. Kim
*Attorney, Agent, or Firm*—Limbach & Limbach

[57] ABSTRACT

A hard disk drive (HDD) stores a plurality of parameter data for determining a filter characteristic, which is necessary for the operation of a read/write circuit, to ROM in advance. At the time of driving HDD, a host computer designates parameter data in a predetermined order, and executes a verification processing with the operation of the read/write circuit for every parameter data. The host computer determines parameter data showing a minimum read error rate as a suitable value in accordance with the result of the verification processing. A CPU of HDD stores parameter data having the suitable value determined by the host computer to a nonvolatile read/write memory. CPU sets a parameter, which corresponds to parameter data stored in the read/write memory, in the read/write circuit.

7 Claims, 7 Drawing Sheets

| ZONE | PARAMETER CODE | ERROR COUNT VALUE | PARAMETER DATA |
|---|---|---|---|
| 0 | 1 | X1 | |
| | 2 | X2 | |
| | 3 | MINIMUM | PD3 |
| | ⋮ | ⋮ | ⋮ |
| 1 | 1 | X3 | |
| | 2 | MINIMUM | PD2 |
| | ⋮ | ⋮ | ⋮ |
| ⋮ | ⋮ | ⋮ | ⋮ |
| 4 | | | |

DATA RECORDING AND REPRODUCING APPARATUS HAVING READ/WRITE CIRCUIT WITH PROGRAMMABLE PARAMETER MEANS

BACKGROUND OF THE INVENTION

1. Field of the Invention

The present invention relates to a magnetic disk drive, and more particularly to a data recording and reproducing apparatus having a read/write circuit capable of setting a parameter necessary for a read/write operation for reproducing data from the disk or recording data to the disk.

2. Description of the Related Art

Conventionally, a magnetic disk drive comprises a read/write circuit for reproducing a read data from read signal read from the disk by a head and converting recording data to be recorded to the disk to a write signal (write current).

The read/write circuit can be largely classified to a data reproducing system including an amplifying circuit, a filter circuit, a read pulse generator, and a data recording system for converting recording data to a write current. In the magnetic disk drive, data is recorded to the disk by a predetermined recording frequency, and a data transfer rate at the time of data reproduction is determined based on the recording frequency. In the read/write circuit, it is required that various types of parameters, which are necessary for the read/write operation, be set to suitable values in order to correctly reproduce data recorded by the predetermined recording frequency.

For example, a low pass filter is used as a filter circuit, and parameters such as a cutoff frequency and quantity of boost (dB) must be set to be suitable values. More specifically, for example, as a filter circuit for the read/write circuit, there is used an integrated circuit such as "Power Programmable Electronic Filter (type: SSI32F8001/8002)" manufactured by Silicon Systems Inc. or "Pulse Detector with Programmable Filter (type: SSI32P3040)." Such a filter circuit has an input terminal for setting parameters such as a cutoff frequency or quantity of boost by an input voltage or an input current. Normally, a micro processor (CPU) of the magnetic disk drive sets such parameters in manufacturing the magnetic disk device.

The suitable values of the parameters of the filter circuit forming the read/write circuit are set in manufacturing the magnetic disk drive. However, in a case that the magnetic disk drive shipped as a product is driven, the parameters of the read/write circuit set in manufacturing the drive are not always set to the suitable values by characteristic variations of each parts in manufacturing the drive. Due to this, a read error, which is beyond an allowable range, is often generated.

Particularly, in the magnetic disk device of constant density recording (CDR) type, since the data transfer rate differs for every zone, the suitable parameter of the read/write circuit must be set for every zone. In the CDR type, a plurality of tracks on the disk are divided into a plurality of zones in a radial direction such that a recording density is set be relatively constant over the entire recording surface of the magnetic disk. In other words, the number of sectors differs for each zone. More specifically, the number of sectors is larger toward the zone of the outer peripheral side, and smaller toward the zone of the inner peripheral side. Due to this, the data transfer rate differs for every zone.

Even in such a CDR system, the suitable parameter for every zone of the read/write circuit is normally set in manufacturing the drive. Therefore, similar to the above case, when the magnetic disk drive shipped as a product is driven, the parameters of the read/write circuit set in manufacturing the device are not always set to the suitable values by characteristic variations of each parts in manufacturing the device.

SUMMARY OF THE INVENTION

An object of the present invention is to realize a data recording/reproducing apparatus such as a magnetic disk drive which can set a parameter of a read/write circuit to be a suitable value at the time of driving the apparatus to realize correct data recording/reproducing.

In order to attain the above object, there is provided a data recording and reproducing apparatus, which comprises a read/write circuit means for reproducing recorded data from a signal read out from a disk by a head, for outputting a write signal to the head for recording data to the disk, the read/write circuit means providing an input means to input a parameter for read/write operation; specifying means for preparing a plurality of parameters for determining an operation characteristic of the read/write circuit means to set the parameter one by one in a predetermined order; memory means for storing the parameter to be inputted to the read/write circuit means; read/write control means for storing the parameter set by the specifying means to the memory means, reading the stored parameter from the memory means, inputting the read parameter to the input means of the read/write circuit means, and executing an operation of the read/write circuit for every parameter set in the predetermined order; determining means for measuring an error rate of read data reproduced from the disk by the head for every parameter in accordance with the read/write operation of the read/write circuit means to determine a parameter corresponding to a minimum error rate; and memory control means for storing the parameter determined by the determining means to the memory means as a suitable value for the read/write means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Embodiments of the present invention will be explained with reference to the drawings.

Figure 1:
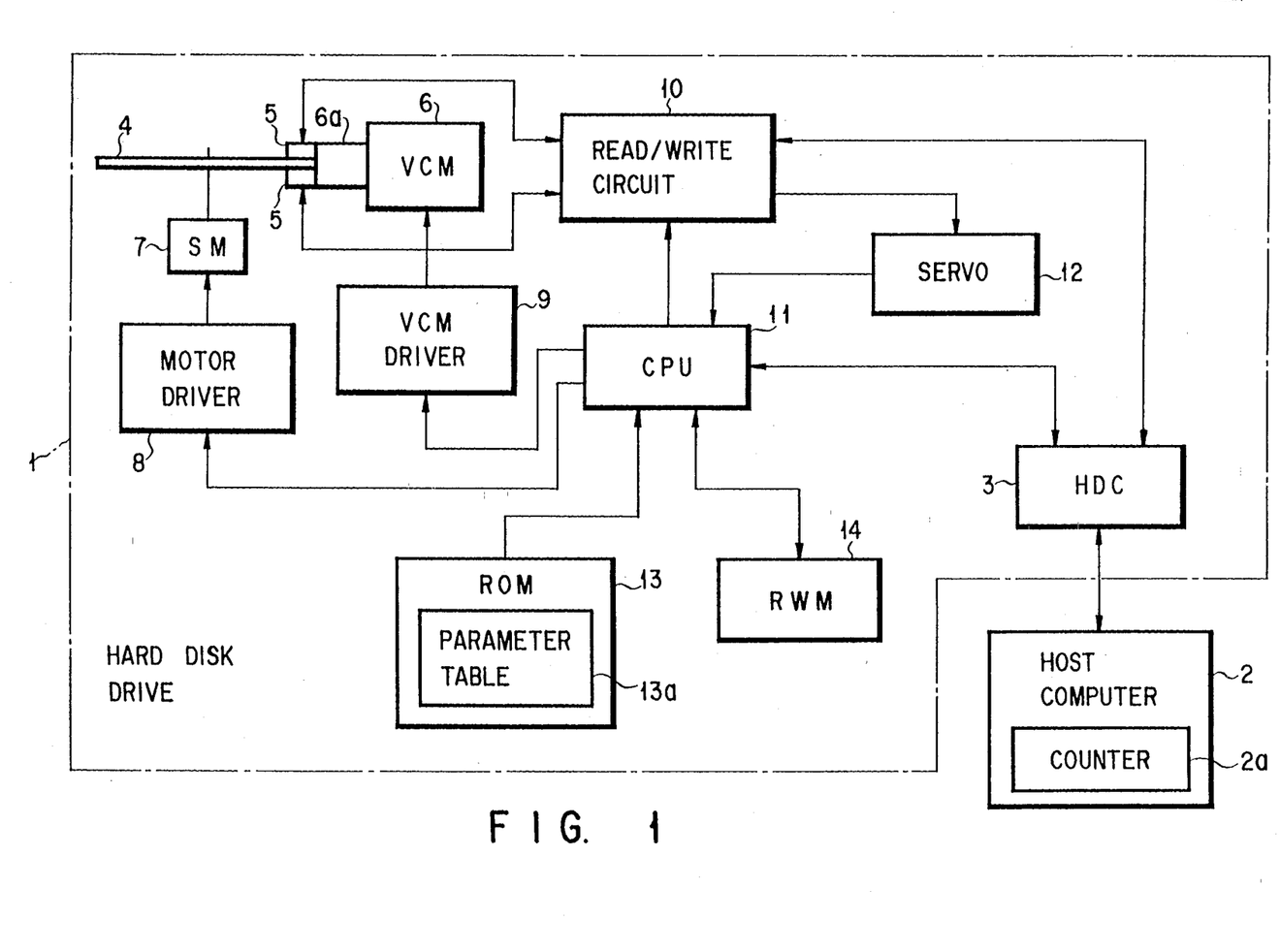
FIG. 1 is a block diagram showing a main part of a magnetic disk device of an embodiment of the present invention.

A magnetic disk drive shown in FIG. 1 is a hard disk drive (HDD) 1, which executes a read/write operation of data from/to a disk 4 in accordance with access of a host computer 2. One disk 4 or a plurality of disks 4 is provided. In this embodiment, the number of disk 4 is set to one for convenience.

A head 5 is provided on each of both surfaces of the disk 4, and held by a head actuator 6a. The head actuator 6a is driven to be rotated by a voice coil motor (VCM) 6 and move the head 5 in a radial direction of the disk 4. The disk 4 is rotated at a high speed by a spindle motor (SM) 7. The spindle motor 7 is driven by supplying a drive current from a motor driver 8 due to control of a CPU 11. On the other hand, the VCM 6 is driven by supplying a drive current from a VCM driver 9 due to control of the CPU 11.

A read/write circuit 10 inputs a read signal (analog signal) read by the head 5, generates digital read data from read signal, and outputs digital read data to a hard disk controller (HDC) 3. A read/write circuit 10 converts record data (write data) outputted from HDC 3 to a write signal (write current) and supplies the write signal to the head 5.

HDC 3 forms an interface between HDD 1 and the host computer 2, and exchanges read/write data or various types of signals (including command from the host computer 2). A CPU 11 is a microprocessor (microcontroller) for controlling each structural element of HDD 1. In this embodiment, CPU 11 executes the processing for setting a predetermined parameter of a read/write circuit 10.

CPU 11 is operated by a program stored in a ROM (read-only memory) 13. In this embodiment, a parameter table 13a, which is formed of a plurality of parameters for determining an operation characteristic of the read/write circuit 10, is stored in ROM 13. A read/write memory (RWM) 14 is a nonvolatile memory to maintain the parameter, which is accessed by CPU 11 and set to the read/write circuit 10. More specifically, the RWM 14 is formed of EEPROM (an electrically erasable programmable read-only memory).

A servo circuit 12 is a circuit for positioning the head 5 at a destination track (cylinder) on the disk 4. More specifically, the servo circuit 12 controls the head 5 to be positioned at the destination track based on a signal outputted from the read/write circuit 10.

Figure 2:
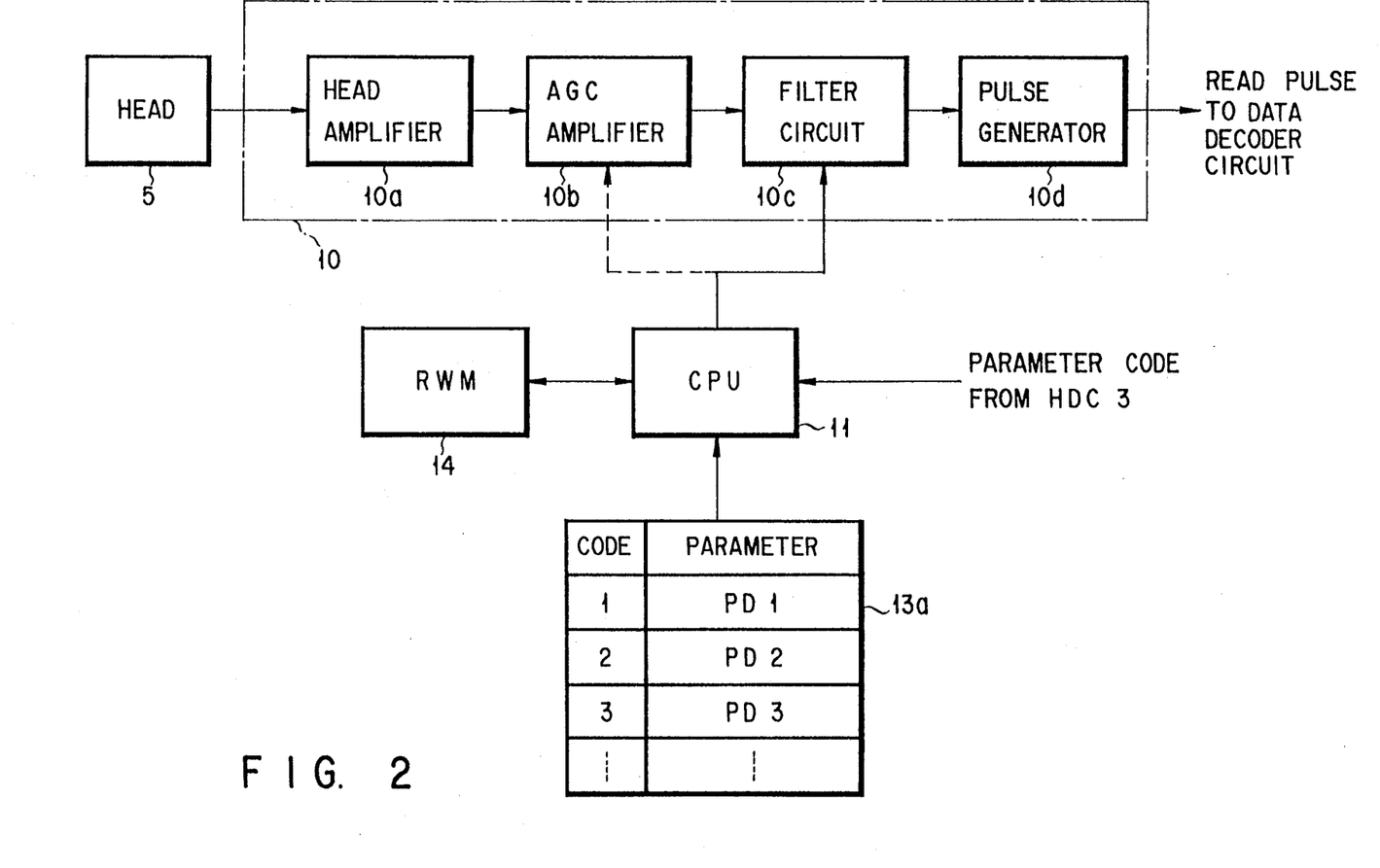
FIG. 2 is a block diagram showing a read/write circuit and its peripheral portion of the embodiment of FIG. 1.

The read/write circuit 10 includes a head amplifier 10a, an AGC (automatic gain control) amplifier 10b, a filter circuit 10c, and a pulse generator 10d, as shown in FIG. 2. These circuits 10a to 10d are elements forming the data reproducing system, and output a read pulse from the read signal read by the head 5. The read pulse is reproduced to read data of an NRZ code by a data decoder circuit (not shown). HDC 3 transfers reproduced data to the host computer 2.

In this embodiment, if the parameter code is provided to the host computer 2 through HDC 3, parameter data PDn, which is designated by the parameter code, is accessed from the parameter table 13a of ROM 13. CPU 11 sets the parameter, which is in accordance with the accessed parameter data PDn, to the read/write circuit 10. CPU 11 stores the parameter PDn to be stored in the read/write circuit 10 to the RWM 14.

As one example, the following will explain the processing for setting the parameter of the filter circuit 10c of the read/write circuit 10.

The filter circuit 10 is an integrated circuit having an input terminal for setting the parameters such as the cutoff frequency and the quantity of boost by an input voltage or an input current. More specifically, there can be used "Power Programmable Electronic Filter (type: SSI32F8001/8002)" manufactured by Silicon Systems Inc. or "Pulse Detector with Programmable Filter (type: SSI32P3040)."

Such a parameter setting processing will be explained with reference to the flow charts of FIGS. 3A and 3B.

The parameter setting processing is started by turning on a system power or designation of the host computer 2. In the parameter setting processing of the present invention, a verification processing of read data is performed when measuring data is recorded in the disk 4 and measuring data is read. The parameter, which corresponds to the minimum error rate, is set as a suitable value based on the result of the error check processing.

More specifically, the host computer 2 sets the number of combinations of parameters N (parameter number N) (step S1). In this case, N=10 just for convenience. The host computer 2 outputs a parameter code, and designates an initial parameter (step S2). CPU 11 accesses parameter data (e.g., PD1), which corresponds to the parameter code inputted through HDC 3, from the parameter table 13a of ROM 13, and stores parameter data to RWM 14 (step S3). Moreover, CPU 11 performs a processing for inputting the parameter, which corresponds to the parameter data PD1 stored in RWM 14, to the filter circuit 10c of the read/write circuit 10 (step S4).

Figure 9:
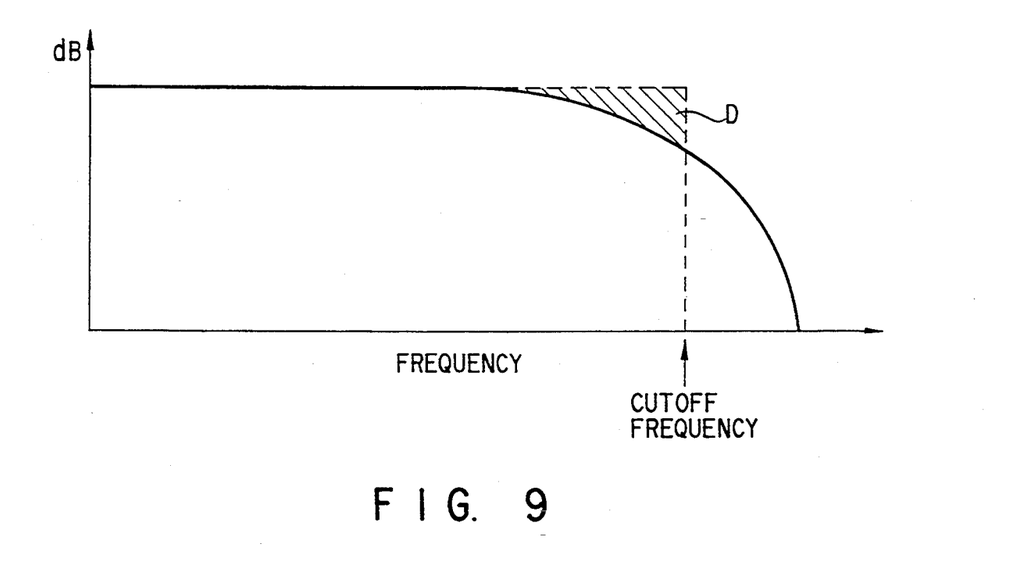
FIG. 9 is a view for explaining a characteristic of a filter circuit used in the read/write circuit of FIG. 8.

The parameters such as the cutoff frequency and the quantity of boost are set in the filter circuit 10c by the input voltage or the input current through an input terminal dedicated to a parameter input. In the read/write circuit 10 of HDD 1, the filter circuit 10 is a low-pass filter (LPF) for cutting off noise, which is a high frequency component, from the read signal of an analog signal read by the head 5. FIG. 9 is an example showing a characteristic of LPF. In LPF, it is ideal that all frequencies, which are higher than the set cut-off frequency, are cut off. However, in actual, it is impossible to completely cut off noise, which is a high frequency component. In a D area shown by slanting lines of FIG. 9, since the output level of the output signal drops, amplitude of the analog signal becomes small and the level of the analog signal cannot be detected.

Figure 6:
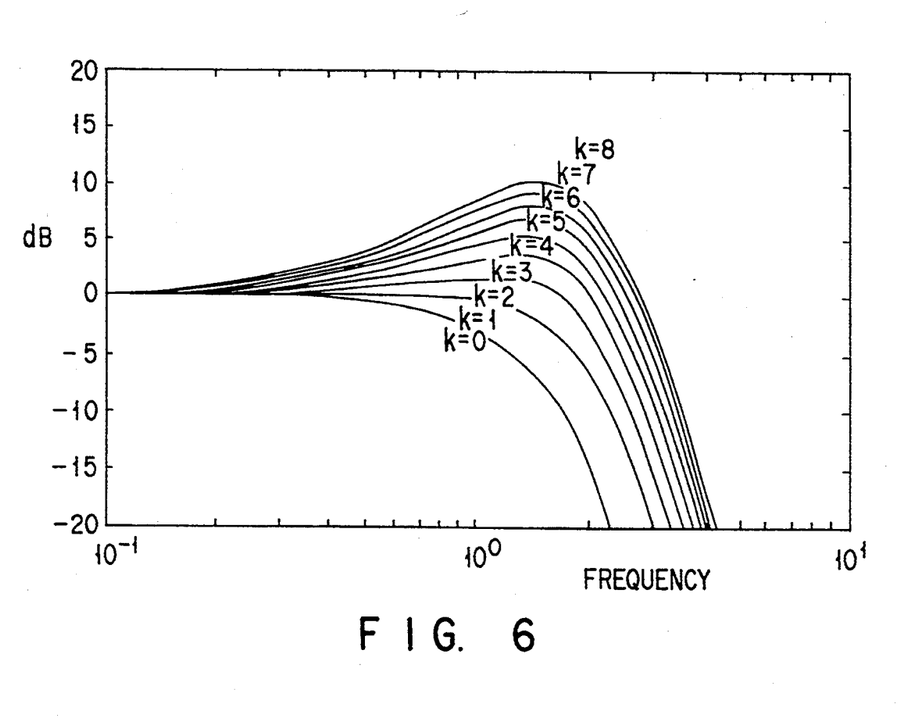
FIG. 6 is a view for explaining a characteristic of a filter circuit used in the read/write circuit of the embodiment of FIG. 1.

Due to this, a boost function of boosting the area where the output level of the output signal drops is provided in the filter circuit 10c. The parameter of the boost function is the quantity of boost (dB). FIG. 6 is a specific example showing the state that the output level of the output signal is raised by setting the quantity of boost (dB) (value of k, which is from 0 to 8).

If the processing of setting the initial parameter is ended, the host computer 2 outputs a verification command to execute the verification processing (step S5). In other words, the host computer 2 outputs measuring data to HDC 3. Thereby, the head 5 records data corresponding to measuring data on the disk 4. Then, measuring data is read from the disk 4 by the head 5 (step S6).

In other words, if the read signal read from the disk 4 by the head 5 is outputted to the read/write circuit 10, the read/write circuit 10 reproduces read data corresponding to recorded measuring data. HDC 3 detects whether or not an error is present in reproduced read data. If the error is detected, HDC 3 transfers error data to the host computer 2. The host computer 2 executes a read error check processing (status data check processing) to check whether or not an error is generated (step S7). In this case, the host computer 2 has a counter 2a (routine) for counting the number of error generations for every number of combinations of parameters N (parameter number N). Moreover, in HDD 1, data is normally accessed at a sector unit. Therefore, the host computer 2 executes the read error check of the sector unit. Then, if an error is generated, the host computer 2 performs an increment of the counter 2a (step S8). In this case, the count operation of the counter 2a may be performed in accordance with the error generation of the bit unit from the sector unit.

The host computer 2 repeats such a verification processing until the verification processing to data of all sectors of a predetermined unit is completed (step S9). The predetermined unit may be a head unit (in other words, area unit of disk) or a zone unit to be explained later. In this embodiment, the head unit is used.

If the verification processing to the first head 5 is ended, the host computer 2 performs a decrement of the number of combinations of parameters N (step S10). Moreover, the host computer 2 outputs a next parameter code so as to change the parameter of the read/write circuit 10 (step S12). The CPU 11 accesses different parameter data (e.g., PD2) from the parameter table 13a in accordance with the next parameter code. Similar to the initial time, parameter data PD2 is stored in RWM 14, a parameter corresponding to parameter data PD2 is set to the filter circuit 10c (steps S3 and S4).

Similarly, the host computer 2 executes the verification processing based on the changed parameter (steps S5 to S10). Then, if a predetermined number of combinations of parameters N (10 in this case), that is, the verification processing for only the number of data of prepared parameter data PDn (n=10) is ended, the host computer 2 goes to a processing for determining a suitable parameter (from YES of step S11 to step S13).

Figure 4:
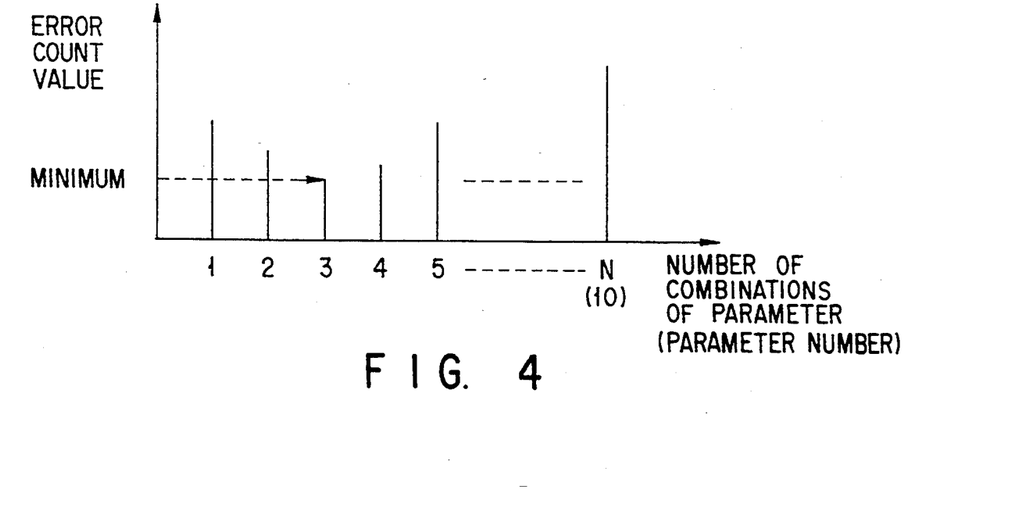
FIG. 4 is a view for explaining a verification processing of the embodiment of FIG. 1.

Here, as shown in FIG. 4, the host computer 2 stores an error count value for every parameter in accordance with the count operation of the counter 2a. The host computer 2 determines a parameter, which corresponds to the minimum count value, from the obtained error count value for every parameter as a suitable value (step S13). In this case, the minimum count value can be obtained when the number of combinations of parameters N is 3, and the parameter corresponds to parameter data PD3.

CPU 11 accesses parameter data (=PD3 in this case), which corresponds to the parameter having a suitable value designated by the host computer 2, from the parameter table 13a of ROM 13, and stores data to RWM 14 (step S14). Then, a parameter setting processing to the second head 5 is performed (step S15).

As mentioned above, parameter data PDn, which corresponds to the parameter having a suitable value of the head unit, is stored in RWM 14. CPU 11 reads parameter data PDn from RWM 14 when the read/write operation of data is executed to the disk 4 in accordance with the access of the host computer 2. Then, the suitable parameter corresponding to parameter data PDn is set to the filter circuit 10c of the read/write circuit 10. Thereby, even if there exist some characteristic variations of the parts in manufacturing HDD 1, a suitable parameter can be set at the time of driving HDD 1, which is shipped as the product.

Next, the following will explain the case in which the parameter setting processing of the present invention is applied to HDD of CDR system.

Figure 7:
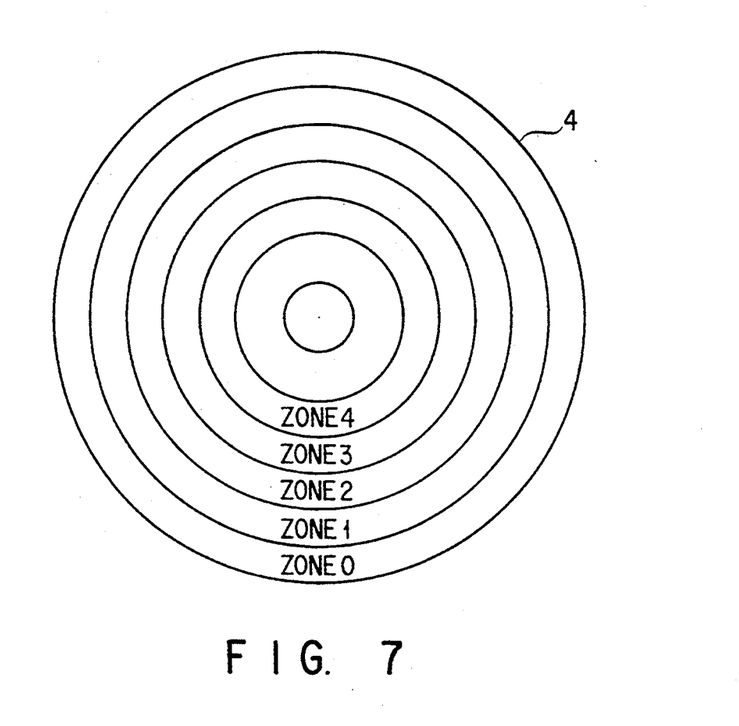
FIG. 7 is a view for explaining the structure of a disk of CDR system of the present invention.

As shown in FIG. 7, in CDR system, all tracks on the disk 4 are divided into a plurality of zones (0 to 4 in this case). The number of sectors of each track included in the same zone is the same, but the number of sectors for each zone differs. In other words, the number of sectors of zone 0, which is positioned at the outer peripheral side, is relatively large, and that of zone 4, which is positioned at the inner peripheral side, is relatively small. Therefore, in CDR system, data record density of each of zones 0 to 4 is the same, but a data transfer rate of each of zones 0 to 4 differs.

In HDD of such a CDR system, it is desirable that the parameter of the filter circuit 10c be set to be a suitable value for every zone 0 to 4. A processing for setting a suitable parameter for every zone 0 to 4 is executed at the zone unit for every head of the magnetic head of the above embodiment, so that suitable parameter data PDn for every zone 0 to 4 can be finally set in RWM 14.

Figure 3A:
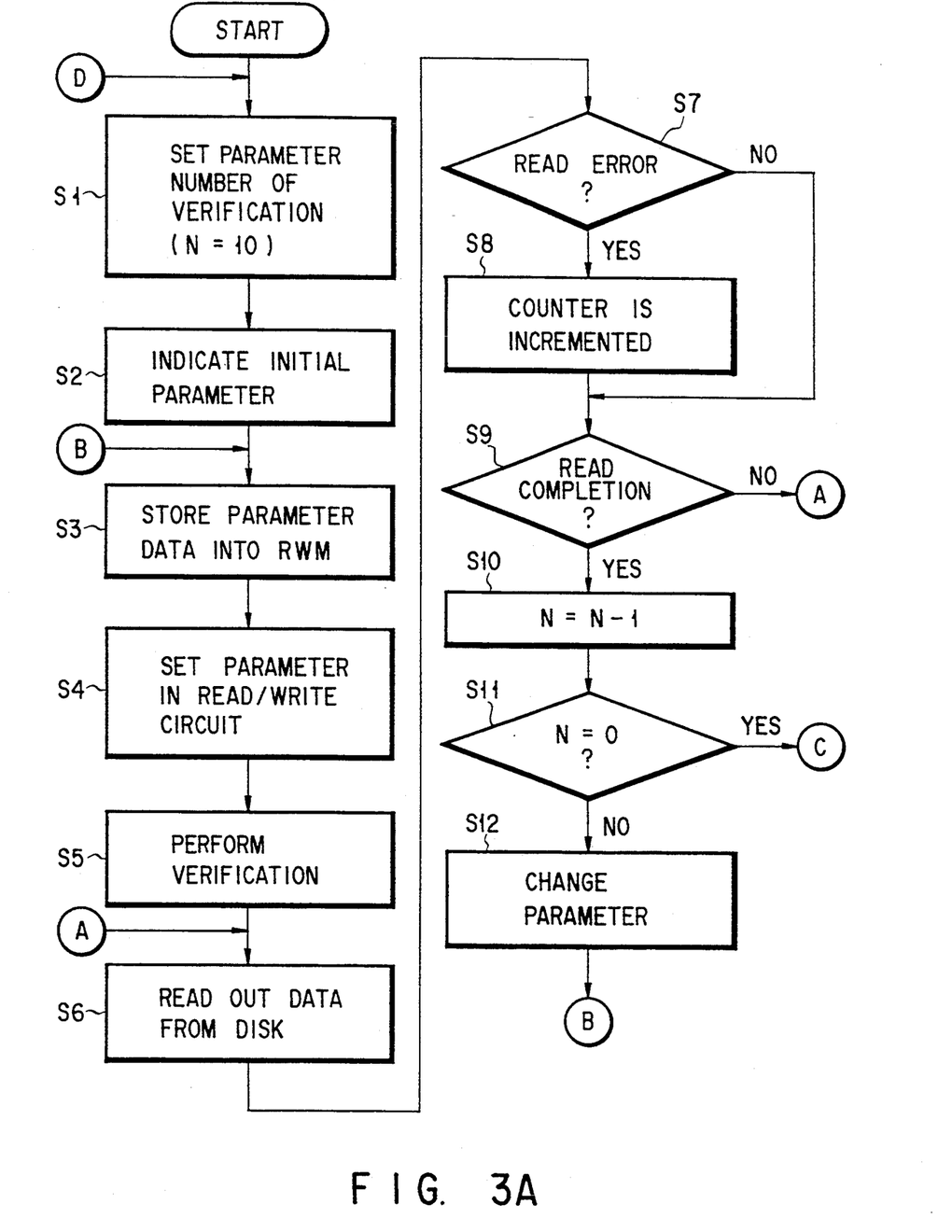
FIGS. 3A and 3B are flow charts for explaining an operation of the embodiment of FIG. 1.
Figure 3B:
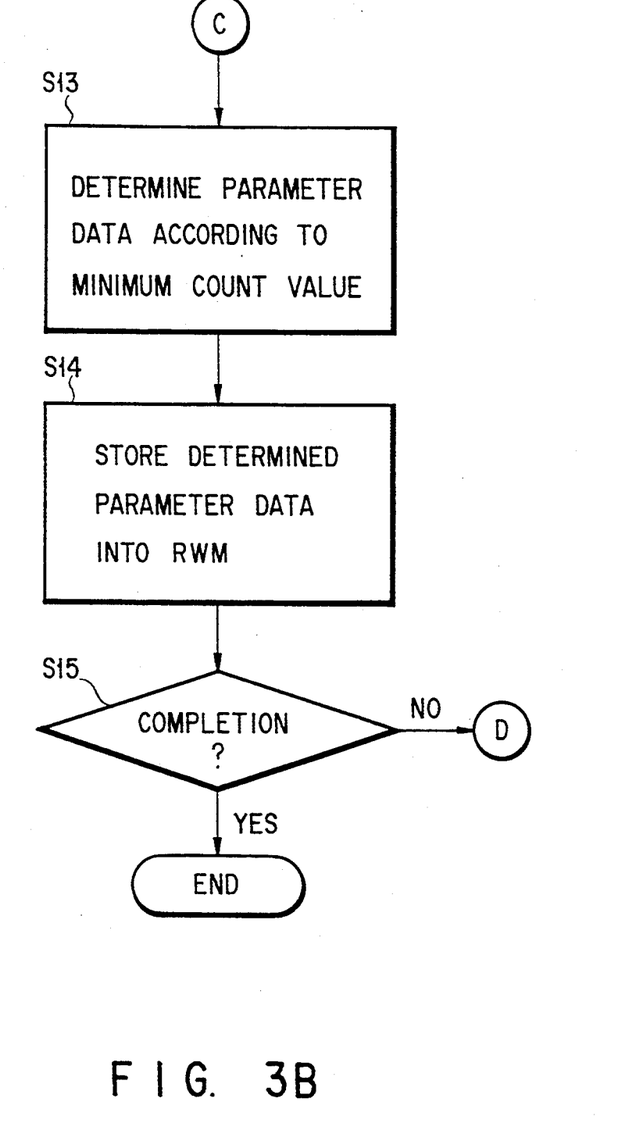
Figure 5:
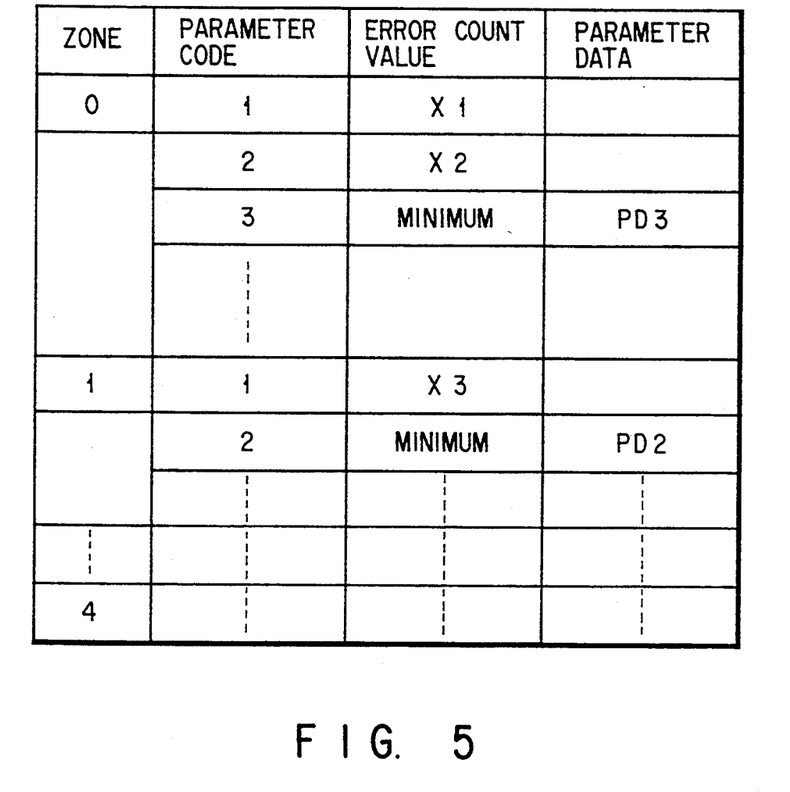
FIG. 5 is a view for explaining a setting processing of a parameter of the embodiment of FIG. 1.

More specifically, in the parameter setting processing shown in FIGS. 3A and 3B, in step S9, the processing, which is from steps S6 to S9, is repeated until the read operations of all sectors of the zone (e.g., zone 0) are ended. In step S15, the parameter setting processing, which is from steps S1 to S15, is repeated until the read operations of all sectors of all zones are ended. By the parameter setting processing of the zone unit, the host computer 2, as shown in FIG. 5, can determine parameter data PDn corresponding to the minimum count value for every zone 0 to 4. For example, in the zone 0 of a certain head, parameter data PD3 is set as a suitable parameter. In the zone 1, parameter data PD2 is set as a suitable parameter.

Therefore, parameter data PDn corresponding to the suitable parameter of the zone unit for every head can be set to RWM 14. CPU 11 reads parameter data PDn from RWM 14 in accordance with each head and each zone when the read/write operation of data is executed to the disk 4 in accordance with the access of the host computer 2. Then, the suitable parameter corresponding to parameter data PDn is set to the filter circuit 10c of the read/write circuit 10. Therefore, the read/write circuit 10 can execute the data reproduction operation based on the suitable parameter for every zone.

Figure 8:
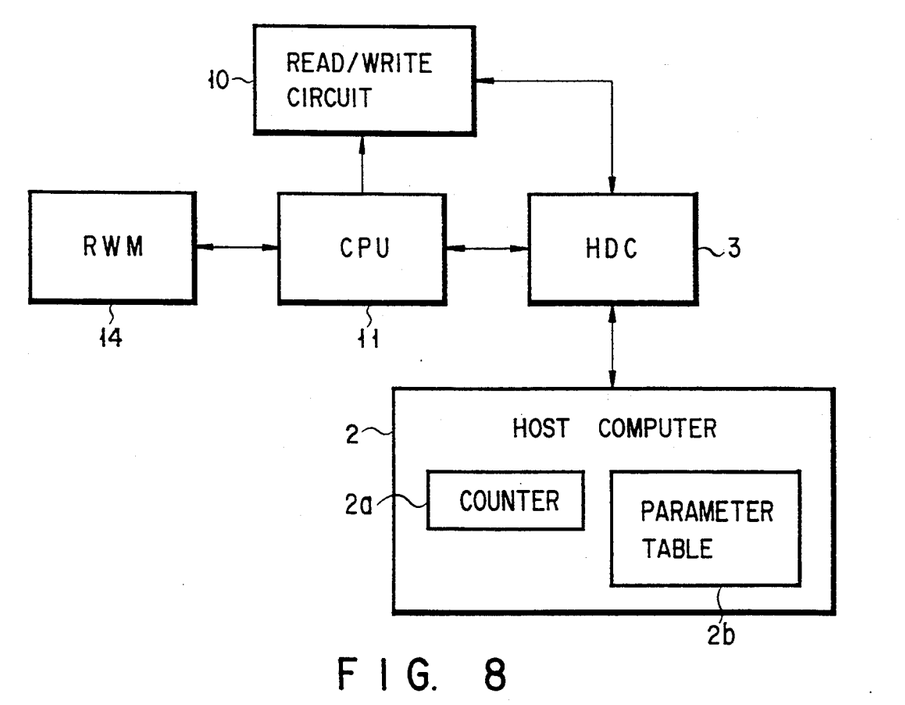
FIG. 8 is a block diagram showing a main part of a magnetic disk device of a modification of the present invention.

FIG. 8 is a block diagram showing a modification of the present invention. In this modification, a parameter table 2b having a plurality of parameters prepared in advance is provided in the host computer 2. In the parameter setting processing shown in FIGS. 3A and 3B, the host computer 2 does not output the parameter code for designating parameter data PDn but supplies parameter data PDn read from the parameter table 2b.

Therefore, CPU 11 stores parameter data PDn, which is provided through HDC 3, to RWM 14, and sets the parameter corresponding to parameter data PDn to the filter circuit 10c of the read/write circuit 10. The other structure and operations will be omitted since they are the same as the case of the embodiment.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A data recording and reproducing apparatus, comprising:
   read and write circuit means for reproducing recorded data from a signal read out from a disk by a head, for outputting a write signal to the head for recording data to the disk, the read and write circuit means comprising a filter circuit with an input means for inputting at least one parameter of a cutoff frequency and quantity of boost for said filter circuit;
   specifying means for preparing a plurality of parameters for determining an operation characteristic of said read and write circuit means and for specifying the parameter in a predetermined order;
   memory means for storing the parameter to be inputted to said read and write circuit means;
   read and write control means for inputting the parameter specified by said specifying means to said input means of said read and write circuit means to execute an operation of said read and write circuit means for every parameter set in said predetermined order;
   determining means for measuring an error rate of read data reproduced from the disk by the head for every parameter in accordance with said read and write operation of said read and write circuit means to determine a parameter corresponding to a minimum error rate; and
   memory control means for storing the parameter determined by said determining means to the memory means as a suitable value for said read and write means.

2. The apparatus according to claim 1, wherein said specifying means is means included in a host computer, and said host computer has memory means for storing the plurality of parameters.

3. The apparatus according to claim 1, wherein said specifying means includes a host computer table memory means for storing said plurality of parameters, and control means for accessing said parameter designated in a predetermined order by the host computer from said table memory means.

4. The apparatus according to claim 1, wherein said memory means comprises a nonvolatile memory storing said parameter and holding the storage after power is off.

5. The apparatus according to claim 1, wherein said read and write control means executes the operation of said read and write circuit means, records measuring data in said disk, and reproduces said measuring data, serving as said read data, from said disk for every parameter.

6. The apparatus according to claim 1, wherein said determining means comprises counter means counting said read data of a predetermined unit from said disk for every parameter by predetermined times, and counting the number of times of errors of said read data for every parameter so as to determine a parameter corresponding to a minimum number of times of errors.

7. A data recording and reproducing apparatus of a constant density recording (CDR) system, comprising:
   a disk having a plurality of tracks, said tracks being divided into a plurality of zones;
   read and write circuit means for reproducing recorded data from a signal read out from the disk by a head, for outputting a write signal to the head for recording data to the disk, the read and write circuit means comprising a filter circuit with an input means for inputting at lease one parameter of a cutoff frequency and quantity of boost for said filter circuit;
   specifying means for specifying a parameter for every zone in a predetermined order such that said parameter denotes a plurality of parameters for determining an operation characteristic of said read and write circuit means;
   memory means for storing the parameter to be inputted to said read and write circuit means;
   read and write control means for inputting the parameter specified by said specifying means to said input means of said read and write circuit means to execute an operation of said read and write circuit for every parameter set in said predetermined order;
   determining means for measuring an error rate of read data reproduced from the disk by the head for every parameter in accordance with said read and write operation of said read and write circuit means to determine a parameter corresponding to a minimum error rate; and
   memory control means for storing the parameter determined by said determining means to the memory means as a suitable value for said read and write means.

\* \* \* \* \*